Jan. 12, 1937.   C. F. TEARS   2,067,802
DECOLORIZING VISCOUS LUBRICATING OIL
Filed July 5, 1933
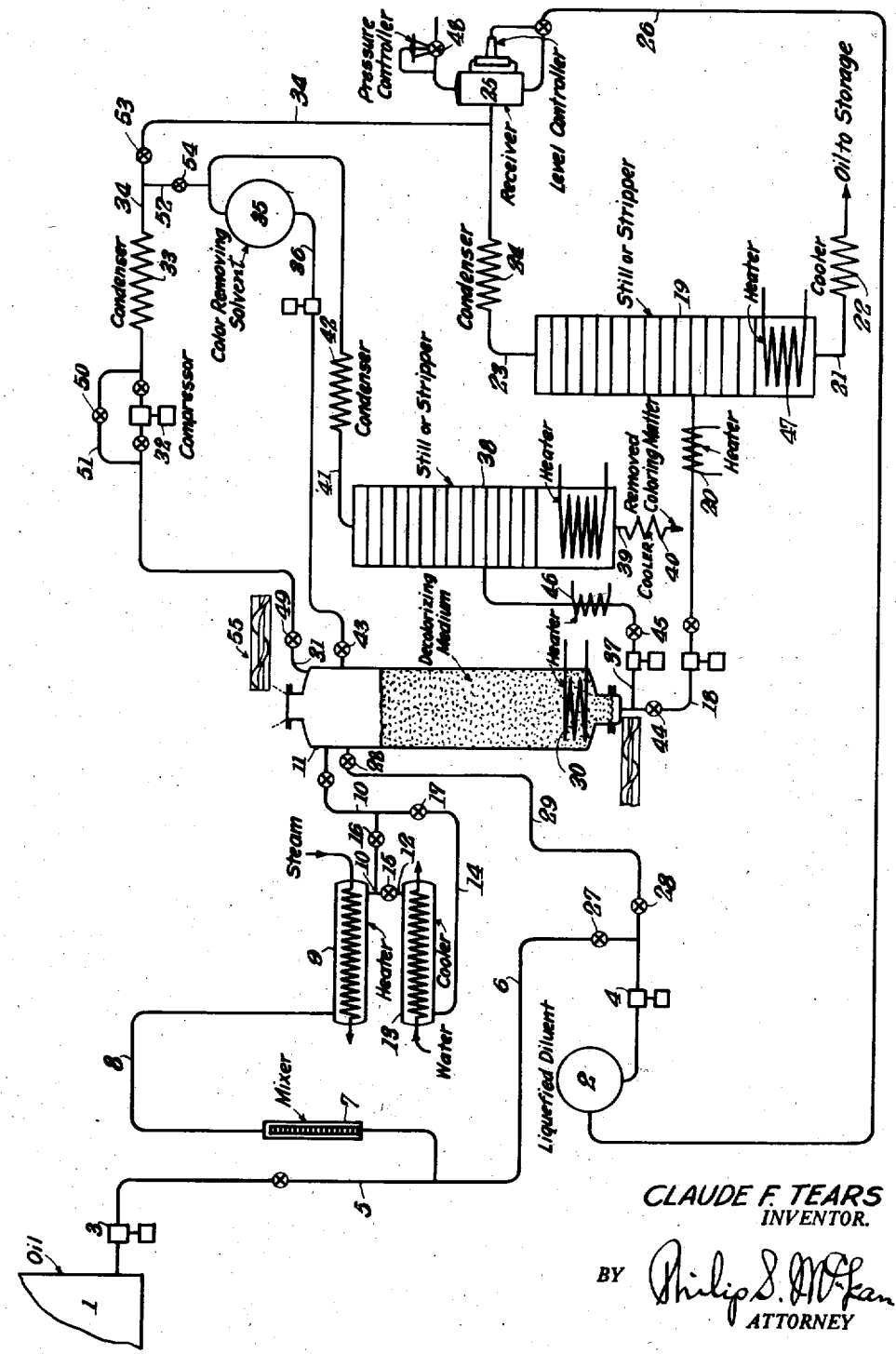
CLAUDE F. TEARS
INVENTOR.
BY Philip S. McKean
ATTORNEY Patented Jan. 12, 1937

2,067,802

UNITED STATES PATENT OFFICE 2,067,802

DECOLORIZING VISCOUS LUBRICATING OIL

Claude F. Tears, Mountain Lakes, N. J., assignor to The Petroleum Processes Corporation, Wichita, Kans., a corporation of Kansas Application July 5, 1933, Serial No. 679,073

7 Claims. (Cl. 196—147)

This invention relates to the decolorizing of oil.

Important objects of the invention are to reduce the expense of operations, materials and equipment, to save solvent and oil losses that have heretofore been incidental to decolorizing processes, to increase the throughput per unit of clay and reduce the time required, to simplify operations and apparatus necessary and to produce in the end a more completely refined or better grade of oil product.

The attainment of these and other desirable objects is effected by the novel features of process, apparatus and materials hereinafter disclosed and broadly claimed.

The drawing accompanying and forming part of the following specification illustrates by way of example one typical and at the present time preferred form of apparatus for carrying out the invention.

The single view in the drawing is a flow sheet diagram illustrating the operation when embodied in a percolation filtration system.

Decolorizing of oil, as well known, is usually effected by use of an adsorbent earth, fuller's earth or "clay" as it is generally termed and a naphtha or gasoline diluent. The percolation method involves the handling of great quantities of diluent and necessarily heavy losses in redistillation or recovery of the same, extensive and expensive equipment for reactivation of the clay, expensive losses of oil and diluent in the burning of the clay and other relatively heavy expenses. The contact method requires the use of finer, more expensive clays, use of special equipment, losses of oil and diluent and expenses in the recovery of the diluent. Also the fine clays used for contacting can not be reactivated economically in the present available equipment. Both processes require a considerable volume of diluent in the system.

In the present invention, the use of a lesser quantity of diluent is made possible by the selection of one of especially low viscosity and great activity and by the operation of the process in a closed system, practically free of losses.

The diluent employed, preferably is a low viscosity hydrocarbon which is gaseous at ordinary temperatures and it is used in a closed system under pressure sufficient to maintain it in the liquid state.

Propane, because of its availability, low cost and the fact that it can be maintained liquid at a pressure of around 150 lbs. at normal temperatures has been used most satisfactorily, but butane and pentane, costing approximately the same, may be used. Methane and ethane may be used, but at present, cost more and require more expensive equipment to maintain the higher pressure necessary to hold them in the liquid state. Others of the unsaturated series, such as ethylene, propylene and butylene may be employed, with modifications necessary to the handling of the same.

The liquid propane or like diluent, because of its extremely low viscosity, penetrates the clay more completely and renders the clay more active or more effective in decolorizing and cleaning the oil. The pressure required to keep the diluent in the liquid form serves also when operating according to percolation methods, as the pressure for operating the filter and recovery of diluent from the clay is made possible by simply releasing this pressure and removing the diluent as a recoverable gas. The propane or like diluent also apparently has an activating effect on the clay, enabling the filter clay to be more or less reactivated by simply washing it in the filter with fresh propane at the end of a run.

The apparatus required is relatively simple, as will be apparent by reference to the accompanying illustration.

In this view, the oil to be decolorized is taken from a storage tank 1, and the propane or similar diluent, under pressure and in the liquid state, is taken from a suitable holder 2, pumps 3 and 4, conveying the same under pressure through lines 5 and 6, into a mixer 7. To assure thorough intimate mixing, the mixture may then be passed by line 8, through a suitable heater 9. From this heater, the mixture may be passed through line 10, direct to the filter chamber 11, or, and this is usually preferable, the mixture may first be passed by line 10—12, through cooler 13, and thence by line 14—10 to the filter, the cooling thus effected enabling operations at lower pressure. Valves 15, 16, 17 are located in the lines connecting the heater and cooler and connecting these with the filter, so that such control may be exercised. Also, if desired, by proper control of these valves, the flow may be sent partly through the heater and partly through the cooler in series with the heater.

By proper control of the steam or other heating medium used with the heater and the water or other cooling medium used with the cooler, desired temperature and pressure conditions may be readily maintained.

The special diluent described makes it possible to use the cheapest grade of decolorizing clay now obtainable, known as XXF. This is of approximately 100 mesh.

The pressure required to keep the propane liquid, ranging in the neighborhood of 150 lbs. at normal atmospheric temperatures is utilized and is a desirable pressure for operating the filter with a clay on the order of that mentioned. If desired or necessary the operating temperatures may be higher and in such case the pressure will of course be higher.

The throughput is shown as carried off from the filter through line 18 to a still or stripper 19, being heated on the way, if desired, by a heater 20.

The stripper 19, may be of more or less usual construction, being shown with the decolorized oil passing off at the bottom at 21, through cooler 22, to storage and the propane or like diluent passing off as a vapor at the top through line 23 and condenser 24, to a receiver 25. From the later, the return line 26, runs back to solvent storage 2. Receiver 25 is normally operated at sufficient pressure to deliver the propane or like, in liquid form, back to the diluent storage tank.

After operating with the propane or like mixture to the desired color of product, the filter may be washed with the propane or like diluent to remove the oil retained in the clay. This can be effected in the illustration by closing the valve 27, in line 6, leading to the mixer and opening valves 28, in the propane line 29, direct to the top of the filter, the oil retained by the clay coming out with the propane at the bottom and being separated at the still 19, in the manner heretofore described. The liquid propane is so active as a cleaning agent as to remove practically all oil from the clay in the filter. It also apparently has some reactivating effect on the clay.

After washing, the propane may be recovered from the clay either simply by reducing pressure in the system and vaporizing the diluent to a compression and condensing system or with use of some heat to evaporate propane from the clay.

A heater for the latter purpose is indicated at 30, in the bottom of the filter. All, or practically all the propane can be removed and recovered through recovery line 31, at the top of the filter and the compressor and condensation system as indicated at 32, 33, discharging through line 34, to the receiver 25. Thus, loss of diluent in the clay is practically entirely eliminated.

Because of the cheapness of the decolorizing medium which can be used in this system and the thorough cleansing of the same by the propane or like diluent, it is economically feasible to discard the clay, without burning, after it has become exhausted with repeated use in the operations described.

It is however, commercially practical to extend the life of the clay by including in the system a circuit for further cleaning and reactivating the dry clay which has been freed of propane or other diluent. Apparatus for the purpose is shown in the illustration consisting of a holder 35, for a color removing solvent connected by line 36, with the top of the filter and a line 37, led off from the bottom of the filter to a still or stripper 38. From the bottom of this still, removed coloring matter is taken off at 39, through a cooler 40, and at the top the solvent is returned at 41, to the holder 35, through a condenser 42. Valves are suitably placed to enable proper use of this color removing solvent, such as indicated at 43, 44, 45, and a suitable heater may be provided in the line running to the stripper, as indicated at 46.

A suitable color removing solvent for use with the system is trichlorethylene, this being particularly effective both in removing coloring matter, oil, or carbon from the propane treated clay and in reactivating the clay.

After reactivating with trichlorethylene or some other suitable color removing solvent a number of times, the clay may be discarded or, if the plant be already equipped with such apparatus, be reactivated in a suitable clay burner. The latter would probably be practiced in existing installations having clay burning equipment, using coarser clays of 30 to 60 or 60 to 90 mesh and burning the clay after each propane filtration and after washing with trichlorethylene becomes no longer sufficiently effective. The use of propane or the like, in the case of a plant equipped with a clay burner, has the advantages of increasing the yield of finished oil per ton of clay, reducing the diluent and oil losses in the clay and reducing the burning costs. In installations however, where no burning equipment is present, it is practical to use a cheap clay, such as the XXF clay mentioned by way of example, and to discard it without burning, after it has appreciably lost its activity in the processing described. In new systems, probably no burning equipment would be installed and hence such outlay would be entirely saved.

The invention embraces other than percolation methods of filtration. Use of propane or like, with attendant advantages, may be employed in contact filtering, for example, as claimed in a separate divisional application, Serial No. 714,494, filed March 7, 1934, as follows:

After mixture of the oil and fine contact clay in an agitator, the slurry may be pumped to a pressure vessel by way of a pressure mixer through which the liquid propane or like diluent would be delivered. This pressure vessel would be equipped with suitable filter units, such as edge type filters, these being situated near the top of the pressure chamber and arranged to be practically self-cleaning, with the clay cake falling to the bottom of the chamber. This operation may be aided by a further circulation of the propane, oil and clay mixture in the bottom of the chamber by withdrawing the mixture from the bottom and delivering the same back into the middle portion of the chamber. This operation has the same advantages over the usual form of contact filters as those pointed out above in conjunction with the percolation method. Another and important advantage is that a cheaper decolorizing medium, such as the XXF clay mentioned, may be used for contacting instead of the more expensive 200 mesh untreated or much more expensive specially treated clays commonly employed with contact filtration.

The invention is suited to the decolorizing of any lubricating oil fractions of petroleum and to the recovery of crank case oils and the like. The equipment required is comparatively simple, as there is only a relatively small volume of propane or like in the system at all times. The system being closed and the pressure being normally of approximately 150 lbs., the possibility of lost diluent is remote. The pressure drop through the filter bed, because of the lessened viscosity is much lower than in previous systems employing naphtha as a diluent.

Other miscible, normally gaseous diluents than those heretofore mentioned may be employed, such for example as carbon dioxide, with pressure of the liquefied diluent utilized as the source of energy for pressure on the filtering medium.

The blending for filtration purposes may be in the ratios from 1:1 up. With higher ratios of say 3 to 4 times the volume of diluent, the action is more rapid, resulting in quicker and more complete color removal with improvements in the character of final products. Apparently, in these greater viscosity reductions, isolation of certain pigment or colloidal compounds, which are normally in solution and inseparable from the oil is effected without requiring excessively higher temperatures and these compounds are rapidly deposited on the clay. The avoidance of excessively high temperatures also avoids certain oxidation reactions with the clay as a catalyst or auto oxidant, avoiding "condensing" of certain forms of coloring matter to be absorbed by the clay surfaces. With the higher temperatures as heretofore used, the clay finally became exhausted by being covered or filled with oxidized products. In the present process, without use of such excessive heat, the pigment material is deposited in the clay without decomposition or oxidation, so that whereas heretofore the deposited matter could only be removed by burning, in the present system the coloring materials are readily removed by solvent extraction with such asphalt and resinous solvents as trichlorethylene, carbon-tetrachloride, acetone, ether and like known solvents.

The extreme dilution effected in this invention, releases the semi-dissolved or colloidal pigments and makes possible filtration through other filter mediums, such as filter paper and edge filters as described for contact filters. This may be accomplished with dilutions on the order of from 1:1 to 1:2. In further stages of dilution in the ranges of from 1:2 to 1:10 parts, that is, one part oil to ten parts solvent, different results are accomplished, enabling isolation and removal of the pigment materials by the clay, with still greater rapidity. These higher dilutions also enable use of other bleaching and filtering mediums, such as bone meal, carbon black, fuller's earth and specially treated decolorizing materials, with much greater efficiency than in present practice. By the solvent action of the diluent, the lower molecular weight compounds are apparently dissolved by the solvent and the heavier molecular weight materials are left in the pigment form for deposition on the clay. Filtering by contact methods is therefore made the more complete. The recovery of the solvent effected simply by releasing the pressure and evaporating the normally gaseous material is particularly advantageous for use in contacting with fine clays from which solvent removal has been particularly difficult when using higher boiling point diluents such as naphtha. It will be apparent, that the invention is adapted to the refining of vegetable and animal oils as well as mineral oils previously considered.

The much lower viscosity of the propane or similar liquefied normally gaseous diluent, such as those heretofore mentioned employed in this invention, as compared with naphtha and like diluents heretofore used, very materially speeds up the decolorizing and refining operation, enabling a plant comparable with present equipment to handle a considerably greater throughput per unit of capital investment. The lessened time required, because of the extremely low viscosity characteristics of the diluent, means also that the diluent need be in contact with the oil only for a comparatively short period and this lesser time of contact is also of advantage in operating on certain oils. The apparent reactivating effect of the diluent on the decolorizing medium seemingly is a result of the very low viscosity of the diluent, which enables it to penetrate deeper and to act on the "clay", in a manner not accomplished with the naphtha and like diluents heretofore used. This greater penetration of the clay by the extremely low viscosity diluent in the decolorizing operation carries the oil deeper into the pores of the clay, making the clay that much more active and effective. The pressure and temperature may vary within wide limits. Thus in the case of propane and in accordance with temperature in the system, the pressure may vary between 150 and 1000 lbs.

The apparatus illustrated, may be operated as a completely closed system, with the pressure required for holding the diluent in the liquid state, generated in the stripper 19. By closely regulating the heater 47 of this still and properly setting the pressure controller 48, of the propane receiver 25, the desired pressure may be maintained in the system with a minimum loss from venting excess pressure to atmosphere at the pressure controller.

After washing the clay with the color removing solute, solvent remaining in the clay may be evaporated and recovered by use of heater 30 in the base of the filter, valve 49 in the vapor recovery line 31, being open at such time, also the valve 50 in the by-pass 51, about the compressor 32, so that flow is direct to condenser 33. The condensed solvent can then be directly returned to the holder 35, through line 34—52, after closing valve 53 and opening valve 54. This recovery system can thus be employed at different times for recovery of diluent and color removing solvent, by-passing the compressor when not needed, as in the latter instance. The decolorizing medium may be suitably supplied to the filter as by conveyor indicated at 55, the filter chamber being closed as indicated during processing operations.

As the invention is of broad scope and capable of modification in various ways, the specification and claims are to be construed accordingly and words and phrases employed herein have been used in a descriptive rather than in a limiting sense and are to be so considered, except possibly for limitations as may be required by state of the prior art.

What is claimed is:

1. The herein disclosed process of decolorizing viscous lubricating oil which comprises heating a mixture of viscous lubricating oil and liquefied propane solvent under pressure to effect complete solution and extreme dilution of the lubricating oil in the solvent, cooling the solution under pressure to a temperature corresponding to a solvent vapor pressure in excess of 150 pounds per square inch thereby reducing the solution to optimum decolorizing temperature, passing the cooled solution through a bed of adsorbent decolorizing clay under pressure in excess of 150 pounds per square inch and distilling the decolorized solution under pressure to separate the solvent from the decolorized oil.

2. The process as in claim 1 in which the solvent to oil ratio ranges between 1 to 1 and 10 to 1.

3. The herein disclosed process of decolorizing viscous lubricating oil which comprises heating a mixture of viscous lubricating oil and liquefied propane solvent under pressure to effect complete solution and extreme dilution of the lubricating oil in the solvent, cooling the solution under pressure to a temperature corresponding to a solvent vapor pressure in excess of 150 pounds per square inch thereby reducing the solution to optimum decolorizing temperature, passing the cooled solution through a bed of adsorbent decolorizing clay under pressure in excess of 150 pounds per square inch and distilling the decolorized solution under pressure to separate the solvent from the decolorized oil, and reducing the pressure on the bed of adsorbent decolorizing clay to release the normally gaseous liquefied hydrocarbon solvent from the adsorbent decolorizing clay in the gaseous state, liquefying the solvent and recycling the same for the treatment of additional lubricating oil.

4. The process as in claim 3 in which the solvent to oil ratio ranges between 1 to 1 and 10 to 1.

5. The herein disclosed process of decolorizing viscous lubricating oil which comprises heating a mixture of viscous lubricating oil and liquefied normally gaseous hydrocarbon solvent to a temperature corresponding to a solvent vapor pressure in excess of 150 pounds per square inch under pressure sufficient to maintain said solvent in the liquid state and passing the heated mixture through a bed of adsorbent decolorizing clay under sufficient pressure to maintain the heated solution in the liquid state.

6. The herein disclosed process of decolorizing viscous lubricating oil which comprises heating a mixture of viscous lubricating oil and liquefied propane solvent under pressure sufficient to maintain said solvent in the liquid state to a temperature corresponding to a solvent vapor pressure in excess of 150 pounds per square inch and passing the heated mixture through a bed of adsorbent decolorizing clay under sufficient pressure to maintain the heated solution in the liquid state.

7. The process of claim 5, including the further steps of periodically interrupting the passage of the oil solution through the bed of adsorbent decolorizing clay and passing fresh liquefied normally gaseous hydrocarbon solvent under pressure sufficient to maintain the solvent in the liquid state through the bed of adsorbent decolorizing clay during such periods of interrupted flow of oil solution.

CLAUDE F. TEARS.

DISCLAIMER 2,067,802.—*Claude F. Tears*, Mountain Lakes, N. J. DECOLORIZING VISCOUS LUBRICATING OIL. Patent dated January 12, 1937. Disclaimer filed October 28, 1939, by the assignee, *The Petroleum Processes Corporation*.

Hereby disclaims claims 5, 6, and 7 in any interpretation that would include heating a mixture of viscous lubricating oil and liquefied normally gaseous hydrocarbon solvent, or propane, or mixtures of propane and butane sometimes defined or termed "propane" or "commercial propane" solvents, to temperatures of not more than 90° F., or not under pressure sufficient to maintain the solvent in such mixtures in a liquid state, or not passing the heated mixture through the bed of adsorbent decolorizing clay under sufficient pressure to maintain the solvent in the heated solution in the liquid state while in contact with the adsorbent decolorizing clay.

[*Official Gazette November 21, 1939.*]

vent to oil ratio ranges between 1 to 1 and 10 to 1.

3. The herein disclosed process of decolorizing viscous lubricating oil which comprises heating a mixture of viscous lubricating oil and liquefied propane solvent under pressure to effect complete solution and extreme dilution of the lubricating oil in the solvent, cooling the solution under pressure to a temperature corresponding to a solvent vapor pressure in excess of 150 pounds per square inch thereby reducing the solution to optimum decolorizing temperature. passing the cooled solution through a bed of adsorbent decolorizing clay under pressure in excess of 150 pounds per square inch and distilling the decolorized solution under pressure to separate the solvent from the decolorized oil, and reducing the pressure on the bed of adsorbent decolorizing clay to release the normally gaseous liquefied hydrocarbon solvent from the adsorbent decolorizing clay in the gaseous state, liquefying the solvent and recycling the same for the treatment of additional lubricating oil.

4. The process as in claim 3 in which the solvent to oil ratio ranges between 1 to 1 and 10 to 1.

5. The herein disclosed process of decolorizing viscous lubricating oil which comprises heating a mixture of viscous lubricating oil and liquefied normally gaseous hydrocarbon solvent to a temperature corresponding to a solvent vapor pressure in excess of 150 pounds per square inch under pressure sufficient to maintain said solvent in the liquid state and passing the heated mixture through a bed of adsorbent decolorizing clay under sufficient pressure to maintain the heated solution in the liquid state.

6. The herein disclosed process of decolorizing viscous lubricating oil which comprises heating a mixture of viscous lubricating oil and liquefied propane solvent under pressure sufficient to maintain said solvent in the liquid state to a temperature corresponding to a solvent vapor pressure in excess of 150 pounds per square inch and passing the heated mixture through a bed of adsorbent decolorizing clay under sufficient pressure to maintain the heated solution in the liquid state.

7. The process of claim 5, including the further steps of periodically interrupting the passage of the oil solution through the bed of adsorbent decolorizing clay and passing fresh liquefied normally gaseous hydrocarbon solvent under pressure sufficient to maintain the solvent in the liquid state through the bed of adsorbent decolorizing clay during such periods of interrupted flow of oil solution.

CLAUDE F. TEARS.

DISCLAIMER 2,067,802.—*Claude F. Tears*, Mountain Lakes, N. J. DECOLORIZING VISCOUS LUBRICATING OIL. Patent dated January 12, 1937. Disclaimer filed October 28, 1939, by the assignee, *The Petroleum Processes Corporation*.

Hereby disclaims claims 5, 6, and 7 in any interpretation that would include heating a mixture of viscous lubricating oil and liquefied normally gaseous hydrocarbon solvent, or propane, or mixtures of propane and butane sometimes defined or termed "propane" or "commercial propane" solvents, to temperatures of not more than 90° F., or not under pressure sufficient to maintain the solvent in such mixtures in a liquid state, or not passing the heated mixture through the bed of adsorbent decolorizing clay under sufficient pressure to maintain the solvent in the heated solution in the liquid state while in contact with the adsorbent decolorizing clay.

[*Official Gazette November 21, 1939.*]

DISCLAIMER 2,067,802.—*Claude F. Tears*, Mountain Lakes, N. J. DECOLORIZING VISCOUS LUBRICATING OIL. Patent dated January 12, 1937. Disclaimer filed October 28, 1939, by the assignee, *The Petroleum Processes Corporation*.

Hereby disclaims claims 5, 6, and 7 in any interpretation that would include heating a mixture of viscous lubricating oil and liquefied normally gaseous hydrocarbon solvent, or propane, or mixtures of propane and butane sometimes defined or termed "propane" or "commercial propane" solvents, to temperatures of not more than 90° F., or not under pressure sufficient to maintain the solvent in such mixtures in a liquid state, or not passing the heated mixture through the bed of adsorbent decolorizing clay under sufficient pressure to maintain the solvent in the heated solution in the liquid state while in contact with the adsorbent decolorizing clay.

[*Official Gazette November 21, 1939.*]